No. 682,251. Patented Sept. 10, 1901.
J. A. GROSHON.
ROTARY ENGINE.
(Application filed Jan. 17, 1901.)

(No Model.) 5 Sheets—Sheet 1.

Fig. 1.

WITNESSES:
INVENTOR
John A. Groshon
BY
ATTORNEY

No. 682,251. Patented Sept. 10, 1901.
J. A. GROSHON.
ROTARY ENGINE.
(Application filed Jan. 17, 1901.)

(No Model.) 5 Sheets—Sheet 3.

WITNESSES:
Gustave Dieterich
Edwin H. Dieterich

INVENTOR
John A. Groshon
BY Chas. C. Gill
ATTORNEY

No. 682,251. Patented Sept. 10, 1901.
J. A. GROSHON.
ROTARY ENGINE.
(Application filed Jan. 17, 1901.)

(No Model.) 5 Sheets—Sheet 4.

WITNESSES:
Gustave Dieterich
Edwin H. Dietrich

INVENTOR
John A. Groshon
BY
Chas. C. Gill
ATTORNEY

No. 682,251. Patented Sept. 10, 1901.
J. A. GROSHON.
ROTARY ENGINE.
(Application filed Jan. 17, 1901.)

(No Model.) 5 Sheets—Sheet 5.

Fig. 9.

WITNESSES:
Gustave Dieterich.
Edwin H. Dieterich.

INVENTOR
John A. Groshon
BY
Chas. E. Gill
ATTORNEY

UNITED STATES PATENT OFFICE.

JOHN A. GROSHON, OF NEW YORK, N. Y.

ROTARY ENGINE.

SPECIFICATION forming part of Letters Patent No. 682,251, dated September 10, 1901.

Application filed January 17, 1901. Serial No. 43,581. (No model.)

*To all whom it may concern:*

Be it known that I, JOHN A. GROSHON, a citizen of the United States, and a resident of New York, in the county of New York and State of New York, have invented certain new and useful Improvements in Rotary Engines, of which the following is a specification.

The invention relates to improvements in rotary engines; and it consists in the novel features, arrangement, and combinations of parts hereinafter described, and particularly pointed out in the claims.

The object of the invention is to produce a comparatively inexpensive form of rotary engine in which the power may be generated with an economic use of the steam.

In carrying my invention into effect I provide a rotary wheel (to be keyed upon the shaft to be driven) with pairs of steam chambers or cylinders converging inward from opposite sides of the wheel and in the direction of the motion of said wheel, and this wheel I mount within an exterior casing whose face-plates contain steam-chambers corresponding with the chambers or cylinders in the wheel. In the face-plates of the casing I provide steam-supply channels leading to grooves in the said face-plates, the latter being adapted at the proper time to communicate with transverse channels provided in the hub of the aforesaid wheel, which channels in said hub are in communication with the aforesaid chambers or cylinders in said wheel. During the operation of the engine the steam is supplied from within the face-plates of the casing to the transverse channels in the hub of the wheel, and said steam thence passes into the chambers or cylinders of the wheel and the steam-chambers within the face-plates, with the result that the power of the steam will be exerted against the solid ends of the said cylinders and effect the driving of the wheel.

The invention will be fully understood from the detailed description hereinafter presented, reference being had to the accompanying drawings, in which—

In the drawings, 20 denotes a supporting frame or base for the engine, said base being of any suitable construction and preferably being integral with a circular ring or shell 21, which defines the circular outline of the engine and incloses the rotary wheel 22, which is keyed upon the shaft 23 and confined between the sides or face-plates 24 24, said sides or face-plates 24, together with the ring 21, forming the shell or casing for the rotary wheel 22. The sides or face-plates 24 are provided with suitable glands 25 and at their periphery are secured to the edges of the ring 21 by means of the bolts 26.

Figures 5, 6, 7, 8:
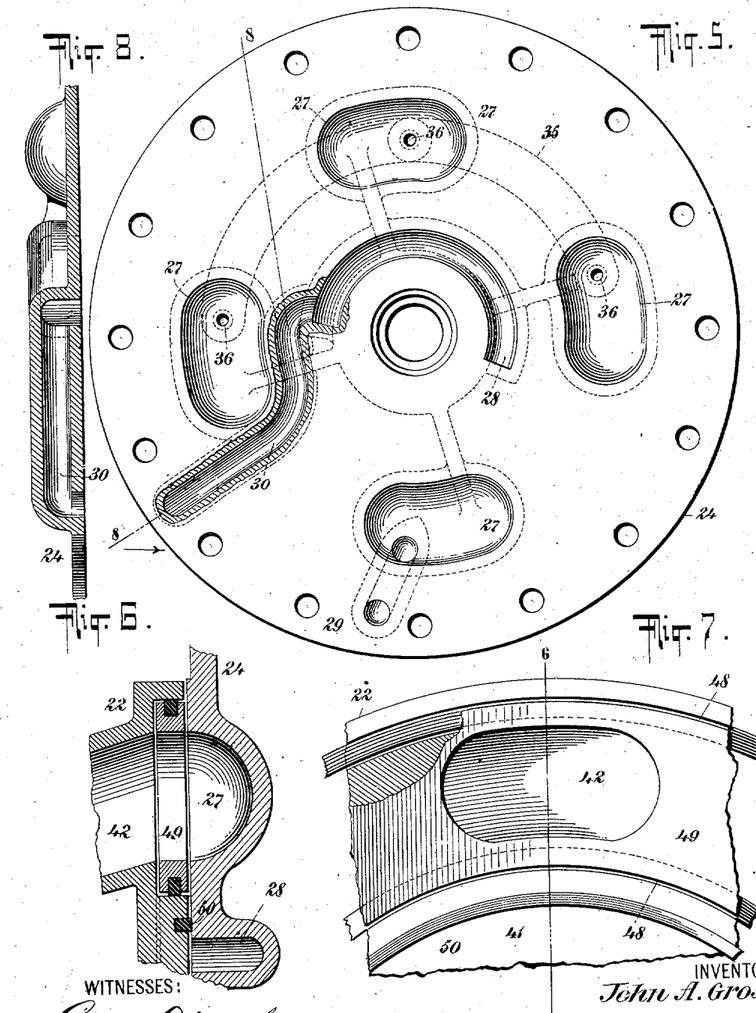
Fig. 5 is a face view, partly broken away, of one of the face-plates or sides of the engine-casing.
Fig. 6 is a vertical sectional view through a part of the wheel and one face-plate on the dotted line 6 6 of Fig. 7.
Fig. 7 is a side elevation of a part of the rotary wheel.
Fig. 8 is a sectional view through one of the sides or face-plates of the engine on the dotted line 8 8 of Fig. 5.
Figure 9:
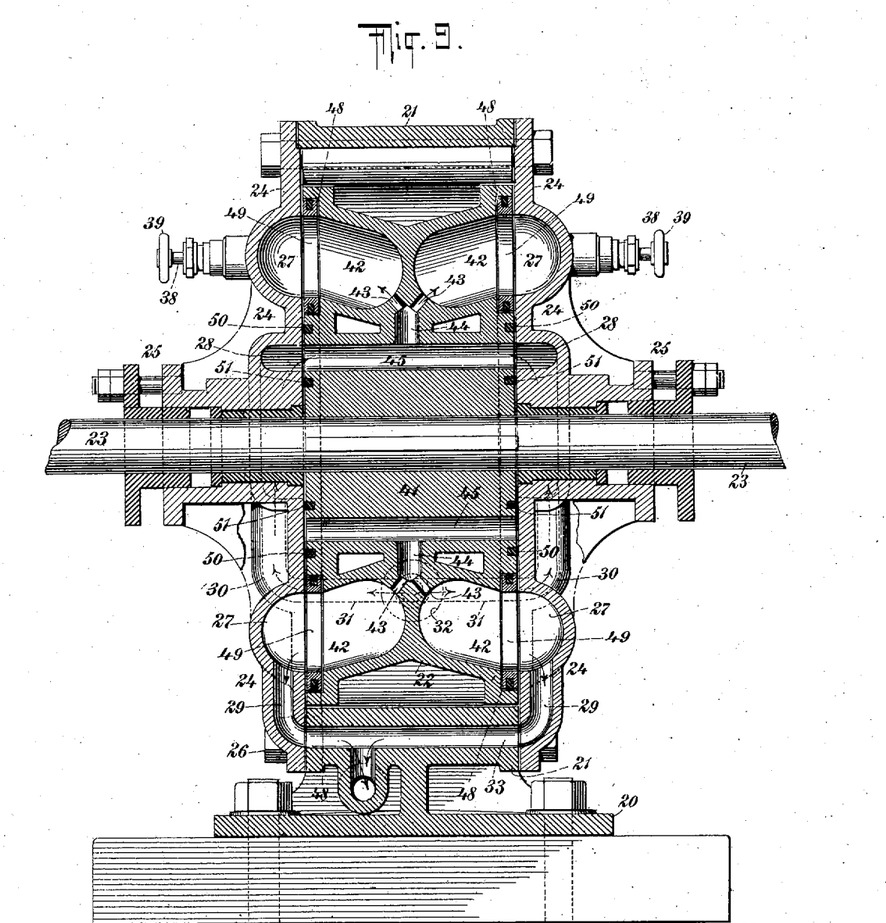
Fig. 9 is a vertical section through the engine on the dotted line 9 9 of Fig. 1.

The face-plates 24 correspond with one another, and each is formed with the series of chambers 27, semicircular groove 28, exhaust-channel 29, and channel 30, leading to the semicircular groove 28, as illustrated in Fig. 5. The chambers 27 are preferably somewhat elongated and substantially semicircular in cross-section, and said chambers are in the form of recesses formed at equal distances apart in the inner face of the sides 24 24. The semicircular groove 28 is, like the chambers 27, in the inner face of the sides 24 24, and the channel 30 is formed within the body of the sides 24, not being exposed throughout its length along the face of the sides 24, but being an interior channel whose outer end passes into communication with the aforesaid groove 28 and whose lower end opens through the inner face of the side 24 and is in communication with a transverse channel 31, Fig. 1, formed in the ring 21, and into which channel 31 is led the supply-pipe 32 for the live steam. In Fig. 5 the inner face of the face-plate 24 is broken out along the line of the channel 30, so as to disclose the said channel, and the transverse channel 31 is in Fig. 2 indicated by dotted lines, wherein it will be seen that the channels 30, one in each face-plate 24, extend upward and open into the semicircular groove or channel 28. In Figs. 2 and 9 I indicate by dotted lines the transverse channel 31, and also the pipe 32 for the supply of steam to said transverse channel 31, whence the steam passes laterally through the channel 31 to the lower ends of the channels 30, up through which the steam passes to the semicircular grooves 28, one of the latter being in each face-plate 24. The lower chamber 27 in each face-plate 24 is connected with an interior exhaust-channel 29, Fig. 5, one exhaust-channel 29 being in each face-plate 24, as shown in Fig. 9, and the two exhaust-channels 29 are in communication with the transverse exhaust-channel 33, which extends through the casing-ring 21 and is in communication with the exhaust-pipe 34, the latter being shown in Fig. 1. The steam thus enters through the pipe 32 to the transverse channel 31, channels 30 in the face-plates 24, and semicircular grooves 28 in the said face-plates, and the exhaust is from the lower chambers 27 in the face-plates 24, through the channels 29 in the face-plates 24, transverse channel 33 in the ring 21, and pipe 34.

Figure 1:
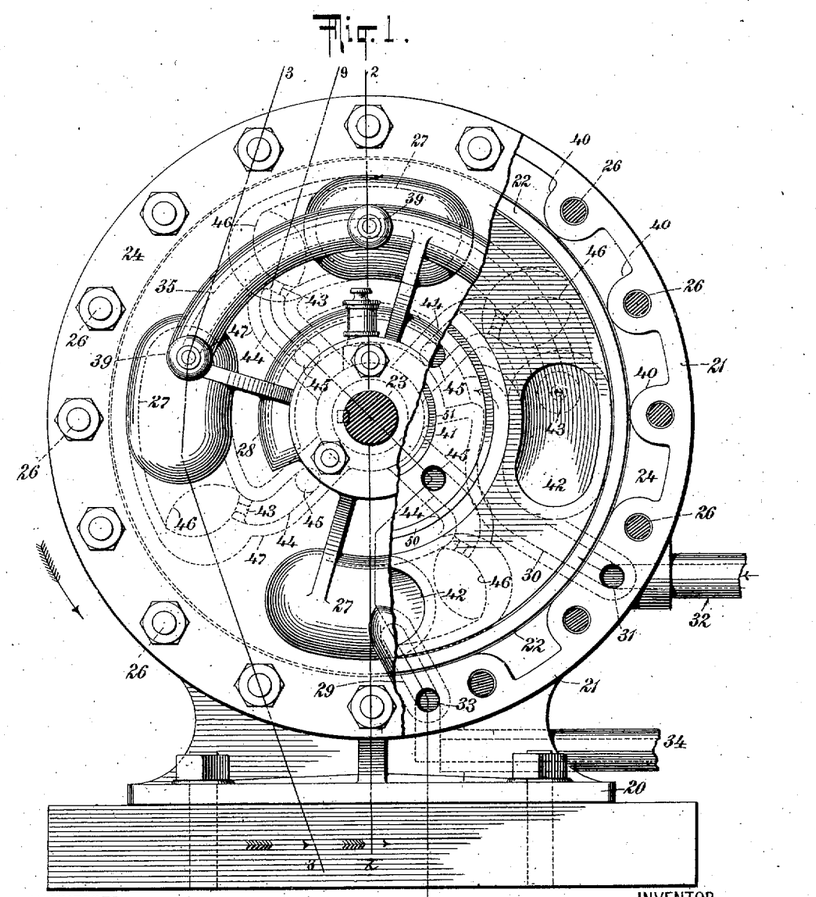
Figure 1 is a side elevation, partly broken away, of a rotary engine constructed in accordance with and embodying the invention.
Figure 2:
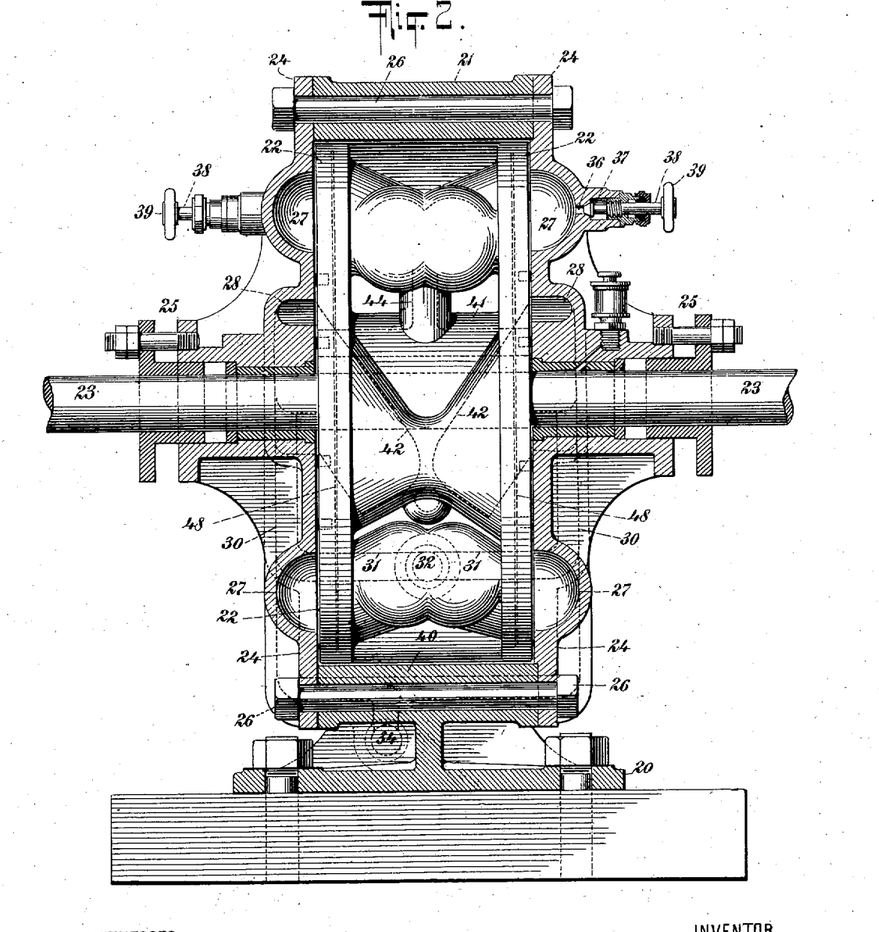
Fig. 2 is a central vertical section of same on the dotted line 2 2 of Fig. 1, the section being through the exterior casing of the engine and the rotary wheel being in elevation.

The face-plates 24 in their preferred construction will be provided with four of the chambers 27, as shown in Fig. 5, and the upper three chambers 27 will at each side of the engine be connected by a cored semicircular channel or passage 35, as indicated by dotted lines in Fig. 5 and full lines in Fig. 1, the channel or passage 35 being capable of being put into communication with any of the three upper chambers 27 through the openings 36, Figs. 2 and 5, which openings 36 are equipped with the valves 37, Fig. 2, having screw-threaded stems 38 and operating-handles 39. The valve-stems 38 pass through suitable glands, and by means of the hand-wheels 39 the valves 37 may be operated to open and close the openings 36, connecting the semicircular cored channels 35 with the said upper three chambers 27. The purpose of the semicircular channels 35, openings 36, and valves 37 will appear hereinafter, it being my purpose at this part of the specification simply to describe the mechanical construction of the face-plates 24.

The valves 37 are capable of independent operation. The face-plates 24 correspond exactly with one another, and their several features have been hereinbefore referred to.

The casing-ring 21 is a cast ring containing the transverse inlet-channel 31 and transverse outlet-channel 33, and said ring 21 is formed with the series of ears 40, Fig. 1, which extend inwardly and receive the bolts 26, by which the face-plates 24 are securely fastened to the opposite side edges of said ring 21.

Figure 3:
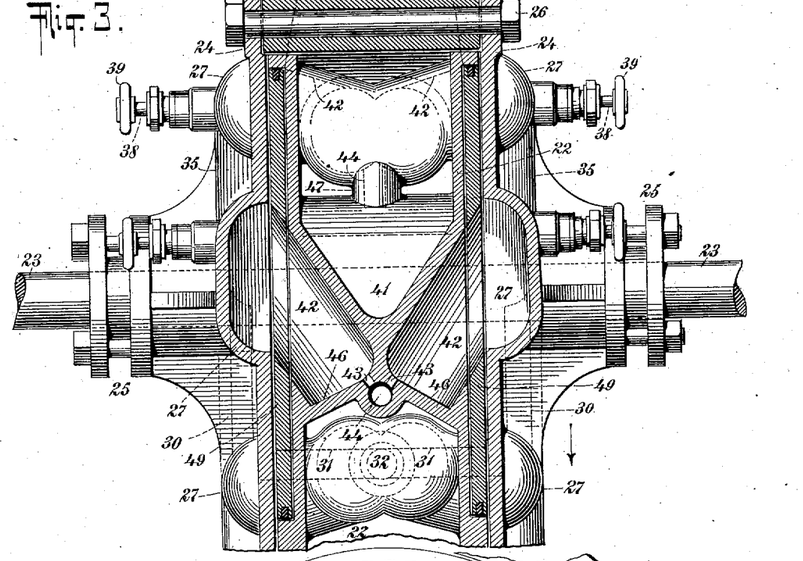
Fig. 3 is a sectional view through a portion of the engine on the dotted line 3 3 of Fig. 1.
Figure 4:
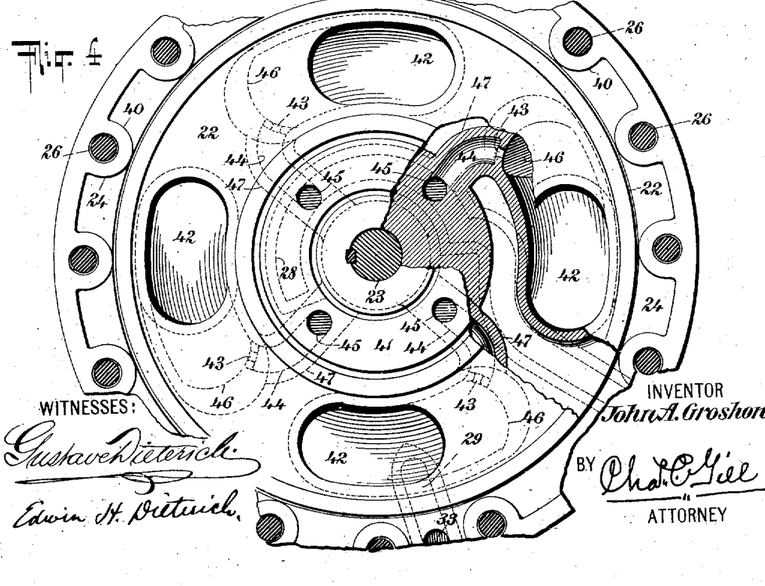
Fig. 4 is a side elevation, partly broken away, of the rotary wheel with a part of the casing surrounding the same, the bolts which extend through said casing being in section.

The rotary wheel 22, confined within the casing comprising the face-plates 24 and ring 21, is of general circular outline and comprises the hub 41, keyed upon the driving-shaft 23, and the series of chambers 42, there being preferably four of the chambers 42 in each face of the wheel 22 to correspond with the four chambers 27, formed in each face-plate 24. The chambers 42 are in pairs and in pairs communicate through ports 43 with the channel 44, Figs. 4 and 9, each channel 44 leading from a channel 45, formed in the hub 41. There are four of the channels 45 in the hub 41, as indicated in Figs. 1 and 4, and each of the channels 45 is in communication through a passage 44 and ports 43 with one pair of the chambers 42, as shown in Fig. 9, the expression "one pair of chambers 42" meaning a pair of adjacent chambers 42, the chambers 42 of each pair being in the opposite sides of the wheel 22 and converging inward toward one another on inclined lines, as shown in Fig. 3, to a substantially flat base or end 46, wherein the ports 43 lead from the passages 44. There is therefore one transverse channel 45 provided in the hub 41 for each pair of the chambers 42, and the transverse channels 45 are at equal distances apart and at such distance from the driving-shaft 23 that during the rotation of the wheel 22 the opposite ends of the said channels 45 will pass into alinement with and travel along the open simicircular grooves 28 in the face-plates 24, thereby establishing a communication for the steam from the said grooves 28 into the said channels 45, whence the steam will pass through the passages 44 and ports 43 into the said chambers 42. The steam can only enter the transverse channels 45 in the hub of the wheel while the ends of the said channels are in communication with the said grooves 28, and hence before any one pair of chambers 42 may receive any of the live steam the channel 45, connected with said chambers, must pass into communication with the grooves 28 in the face-plates 24. After the ends of any special channel 45, during the rotation of the wheel 22, passes beyond and from communication with the semicircular grooves 28 in the face-plates 24 it will be cut off from the source of steam-supply, which is through the grooves 28, and thereupon the ends of said transverse channel 45 will travel downward between the plain portions of the inner faces of the plates 24, and the pair of chambers 42, connected with said channel, will reach and may exhaust, Fig. 9, through the lower chambers 27, channels 29, transverse channel 33, and exhaust-pipe 34. The channels 44 are, as probably more clearly indicated in Figs. 1 and 4, formed in arms 47 which radiate from the hub 41 to the outer portions of the wheel 22, containing the aforesaid chambers 42.

The outer faces of the wheel 22 contain the annular grooves 48, which encompass the outer ends of the hub 41 and receive the rings 49, one ring 49 being set into each face of the wheel 22 and being formed with openings corresponding with the outer ends of the chambers 42 in said wheel 22, as shown in Figs. 3 and 9, said openings in the rings 49 forming, in effect, a continuation of the chambers 42 of the wheel 22 and matching the chambers 27 in the face-plates 24 24. The rings 49 are, as shown in Fig. 9, provided at their peripheries with strips of packing material to engage the adjacent surfaces of the wheel 22; but at their sides the said rings are sufficiently free of the adjacent surfaces of the wheel 22 and face-plates 24 to allow the steam to act upon said sides, and thereby to aid in balancing the wheel and avoid friction. The wheel 22, at the opposite sides of the passages 45 in its hub, is provided with the annular packing-rings 50 51, as shown in Fig. 9, in order to prevent the flow of the steam between the sides of the wheel and the inner faces of the plates 24, said annular packing-rings 50 51 guarding the ends of the transverse channels 45 in the hub 41 and also the semicircular grooves 28 in the face-plates 24.

In the operation of the engine the live steam will be admitted through the supply-pipe 32 to the transverse channel 31, whence the steam will pass through the cored channels 30 and enter the semicircular grooves 28 in the face-plates 24. The semicircular grooves 28 in the face-plates 24 will always be in communication with one or more of the transverse channels 45 in the hub 41 of the wheel 22, and hence the live steam will enter the channel or channels 45 in communication with the grooves 28 and pass thence through the channels 44 and ports 43 into one or more pairs of the chambers or cylinders 42 in said wheel 22, with the effect of filling said chambers or cylinders 42 and the chambers 27 communicating therewith and driving the wheel 22 and shaft 23. The steam filling the chambers or cylinders 42 and communicating chambers 27 acts against the inner ends 46 of the said chambers or cylinders 42 and drives the wheel 22 in the direction in which the said ends 46 extend. The cylinders or chambers 42 converge inward toward one another, as shown, and thus the pressure of the steam is on inclined lines toward the center of the wheel 22, and the latter is enabled to move freely without undue friction and with the greatest economy in the use of the steam.

In the accompanying drawings the hub 41 of the wheel 22 is shown as having four of the transverse channels 45 for communication with the grooves 28 in the face-plates 24, and under such conditions two pairs of chambers or cylinders 42 will always be in communication with the grooves 28; but I desire to be understood that this invention is not limited to the employment of the four or any special number of transverse channels 45, nor is the invention limited to any special length of the grooves 28 in the face-plates 24, since it will at times be a matter of discretion, governed by the special use of the engine, how far the channels 45 in the hub 41 shall follow along the supply-grooves 28, it being apparent that it will only be necessary for the channels 45 to be in communication with the steam-supply long enough to insure the proper economical use of the engine and that the point of "cut-off" of the steam from the channels 45 will vary in accordance with the conditions to be met in the use to which the engine may be applied. The invention is also not limited to the employment of four pairs of chambers 42 and four sets of chambers 27; but when four pairs of chambers 42 and four sets of the chambers 27 are made use of the engine will possess a high degree of efficiency.

In the normal condition of the engine all of the valves 37 will be closed, and hence in such normal condition of the engine the channels 35, connecting the chambers 27, will be closed against said chambers. The valves 37 and channels 35 are made use of more particularly during the starting of the engine and in case of emergency. If, for instance, the wheel 22 should for any reason become centered upon the first entrance of the steam through the supply-pipe 32 one or more of the valves 37 may be opened to permit the steam to pass from one pair of chambers 27 through the channels 35 to distant chambers 27 and their communicating chambers 42, so that the steam-pressure may thus be exerted in such distant chambers 27 42 for the purpose of overcoming the inertia of the wheel 22 and effecting the starting of the said wheel, and thereupon such of the valves 37 as may have been opened will be closed and the engine will be left in its normal condition with the wheel 22 in motion. My purpose is to exclude the atmosphere from the steam-chambers within the casing of the engine and to suitably trap the exhaust-pipe 34 in order that the wheel 22 may as far as possible have its motion within an air-tight casing, thereby to carry out my object of obtaining power from the steam until the latter has substantially reached the atmospheric point and avoid any escape of steam from the exhaust.

The length of the grooves 28 in the face-plates 24 will vary in accordance with the number of the chambers or cylinders 42 it may be desired to have receive at one time the live steam from said grooves, and in the event that it should be so desired the groove 28 may be lengthened in order that live steam may also (through the then lower chambers 42) enter the lower chambers 27 in the face-plates 24, so as to increase the power of the engine to the sacrifice, probably, of economy, and in that event the water of condensation will escape through the channels 29 to the trapped pipe 34. In the event that it should be desired to admit the steam to only one pair of cylinders or chambers 42 at a time the grooves 28 may of course be shortened, so as to confine the admission of the steam to the one pair of chambers or cylinders 42 and the chambers 27 communicating therewith. Such of the chambers or cylinders 42 as it may be desired shall not receive the live steam from the grooves 28 will have their transverse channels 45 in the hub 41 closed or plugged up at their ends or omitted altogether, and in that event the chambers or cylinders 42 not having any communication with the supply for live steam will still be used effectively by reason of the fact that they will travel into communication with the chambers 27 in the face-plates 24 and afford spaces for the expansion of the steam previously left in said chambers 27, and thereby whatever power there may be in the steam on its expansion from the chambers 27 into the chambers 42 will be utilized in driving the engine. If three of the transverse channels 45 in the hub 41 should be closed or omitted, the live steam would then initially enter through the one remaining channel 45 into one pair of the chambers or cylinders 42 and their communicating chambers 27 in the face-plates, and this steam thus admitted would drive the wheel 22 and during the rotation of the said wheel would in part pass into the chambers 27, along which said initial chambers or cylinders 42 travel, and thence from said chambers 27 into the chambers or cylinders 42 not in communication with the live-steam supply, the latter cylinders 42 thus becoming charged with the steam left by the first pair of chambers or cylinders 42 in the chambers 27. The continued rotation of the wheel 22 and the continued charging of the initial pair of chambers or cylinders 42 from the supply for live steam would result in fresh charges of steam being admitted to the several chambers 27 and from them expanded into the chambers or cylinders 42 for driving the wheel 22. Whether the steam should be initially admitted from the source of supply to one pair of cylinders or chambers 42, or to every alternate pair of chambers or cylinders 42, or to all of the cylinders or chambers 42 is a matter which will depend upon the special uses to which the engine may be put and also upon the question of economy and the degree of power required, and these matters will be regulated by the manufacturer in accordance with the existing conditions, it being only necessary on his part to lengthen or shorten the grooves 28 and employ the desired number of transverse channels 45 in the hub 41. The fact that the chambers or cylinders 42 converge inward toward the center of the wheel 22 and in the direction of the line of motion is important, in that thereby the lines of force exerted by the steam are such as to insure the best results, and the fact that the grooves 28 are on opposite sides of the wheel 22 is also of advantage, in that thereby there is a balancing of pressure at the opposite sides of the said wheel and the latter is enabled to rotate with the proper freedom. The chambers 27 should be of such distance from one another that each chamber 42 will pass from communication with one chamber 27 before reaching a communication with the next following chamber 27.

What I claim as my invention, and desire to secure by Letters Patent, is—

1. In a rotary engine the exterior casing comprising the ring and face-plates, the latter having the channels 30 and grooves 28 for the admission of the motive fluid, and also the chambers 27 exposed at their facing sides, combined with the wheel 22, and shaft 23, said wheel being mounted on said shaft within said casing and comprising the hub 41 and outer portion containing the pairs of chambers or cylinders 42 arranged with respect to said chambers 27, said hub having channels to communicate with said grooves 28 and being in communication with the said chambers or cylinders 42; substantially as set forth.

2. In a rotary engine, the exterior casing comprising the ring and face-plates, the latter having the channels 30 and grooves 28 for the admission of the motive fluid, and also having the series of chambers 27 exposed at their facing sides, said grooves 28 being on the arc of a circle, combined with the wheel 22, and shaft 23, said wheel being mounted on said shaft within said casing and comprising the hub 41 and outer portion containing the pairs of inwardly-converging chambers or cylinders 42 arranged with respect to said chambers 27, said hub having the channels 45 to travel along said grooves 28, and said wheel having passages leading from said channels 45 into the said chambers or cylinders 42; substantially as set forth.

3. In a rotary engine, the exterior casing comprising the ring and face-plates, the latter having the channels 30 and grooves 28 for the admission of the motive fluid, the series of chambers 27 exposed at their facing sides, and the valved passages 35 connecting said chambers 27, combined with the wheel 22, and shaft 23, said wheel being mounted on said shaft within said casing and comprising the hub 41 and outer portion containing the pairs of inwardly-converging chambers or cylinders 42 arranged with respect to said chambers 27, said hub having the channels 45 to travel along said grooves 28, and said wheel having passages leading from said channels 45 into the said chambers or cylinders 42; substantially as set forth.

4. In a rotary engine, the exterior casing comprising the ring and face-plates, the latter having the channels 30 and grooves 28 for the admission of the motive fluid, and also having the series of chambers 27 exposed at their facing sides, combined with the wheel 22 having in its faces the annular grooves 48, the flat rings 49 in said grooves 48 and having the packings along their periphery to engage the adjacent walls of said wheel, and the shaft 23, said wheel being mounted on said shaft within said casing and comprising the hub 41 and outer portion containing the pairs of chambers or cylinders 42 arranged with respect to said chambers 27, said hub having channels to communicate with said grooves 28 and being in communication with said chambers or cylinders 42, and said rings 49 having openings to match the open ends of said chambers or cylinders 42; substantially as set forth.

5. In a rotary engine, the exterior casing comprising the ring and face-plates, said ring having the exhaust-channel 33, and said face-plates having the channels 30 and grooves 28 for the admission of the motive fluid, the chambers 27 exposed at their facing sides, and the channels 29 leading from the lower chambers 27 to said exhaust-channel 33, combined with the wheel 22, and shaft 23, said wheel being mounted on said shaft within said casing and comprising the hub 41 and outer portion containing the pairs of chambers or cylinders 42 arranged with respect to said chambers 27, said hub having channels to communicate with said grooves 28 and being in communication with the said chambers or cylinders 42; substantially as set forth.

6. In a rotary engine, the exterior casing comprising the ring and face-plates, the latter having inlet-channels for the motive fluid and also the chambers 27 exposed at their facing sides, combined with the wheel 22, and shaft 23, said wheel being mounted on said shaft within said casing and comprising the hub 41 and outer portion containing the pairs of inwardly-converging chambers or cylinders 42 arranged with respect to said chambers 27, said hub having channels 45 to communicate with said inlet-channels and being in communication with said chambers or cylinders 42; substantially as set forth.

7. In a rotary engine, the exterior casing comprising the ring and face-plates, the latter having inlet-channels for the motive fluid and also the chambers 27 exposed at their facing sides, combined with the wheel 22, and shaft 23, said wheel being mounted on said shaft within said casing and comprising the hub 41 and outer portion containing a pair of inwardly-converging chambers or cylinders 42 whose outer ends are exposed toward said face-plates and adapted to travel along the line of said chambers 27, said hub having a channel 45 to communicate with said inlet-channels and being in communication with said chambers or cylinders 42; substantially as set forth.

8. In a rotary engine, the sides having the inlets for the motive fluid and provided on their inner faces with chambers 27, combined with the wheel 22 connected with the shaft to be driven and comprising the hub 41 having a channel to pass into communication with said inlets and the outer portion having the pairs of inwardly-converging chambers 42 whose outer ends are exposed toward said sides and adapted to travel along the line of said chambers 27, said wheel also having passages for the motive fluid from the channel in said hub to a pair of said chambers 42; substantially as set forth.

9. In a rotary engine, the sides having the inlets for the motive fluid and provided on their inner faces with the chambers 27, combined with the wheel 22 between said sides and connected with the shaft to be driven, said wheel having in its opposite sides the pairs of chambers or cylinders 42 to coöperate with the said chambers in said sides, the hub of said wheel having the channels to follow along the said inlets, and said channels being in communication with the inner ends of the said pairs of chambers or cylinders 42; substantially as set forth.

10. In a rotary engine, the sides having the inlets and provided on their inner faces with the chambers 27, combined with the wheel 22 connected with the shaft to be driven and comprising the hub 41 having channels to travel along in communication with said inlets and the outer portion having the pairs of inwardly-converging chambers or cylinders 42 whose outer ends are exposed toward said sides and adapted to travel along the line of said chambers 27, said wheel also having passages for the motive fluid from the channels in the said hub to the inner ends of said pairs of chambers 42; substantially as set forth.

11. In a rotary engine the casing having in its sides the chambers 27, combined with the wheel 22 between said sides and connected with the shaft to be driven, said wheel having in its opposite sides the pairs of chambers or cylinders 42 to coöperate with the said chambers in said sides, the said wheel having the channels to follow along the inlets for the steam, and said channels being in communication with the inner ends of the said pairs of chambers or cylinders 42; substantially as set forth.

12. In a rotary engine, the casing having the sides provided with the chambers 27, and a suitable supply for the steam, combined with the wheel 22 connected with the shaft to be driven and comprising the hub having channels to communicate with the steam-supply, and the outer portion having the pairs of inwardly-converging chambers or cylinders 42 whose outer ends are exposed toward said sides and adapted to travel along the line of the said chambers 27, said wheel also having passages for the motive fluid to the said pairs of chambers 42; substantially as set forth.

Signed at New York, in the county of New York and State of New York, this 16th day January, A. D. 1901.

JOHN A. GROSHON.

Witnesses:
CHAS. C. GILL,
ANNA V. BRODERICK.